(12) United States Patent
Chou et al.

(10) Patent No.: US 8,648,495 B2
(45) Date of Patent: Feb. 11, 2014

(54) SMART-GRID COMBINATION POWER SYSTEM

(75) Inventors: Li An Chou, Louisville, KY (US); Nathan Desjardin, Bowie, MD (US); James Windgassen, Chester, MD (US)

(73) Assignee: SES Technologies, LLC, Louisville, KY (US)

( * ) Notice: Subject to any disclaimer, the term of this patent is extended or adjusted under 35 U.S.C. 154(b) by 257 days.

(21) Appl. No.: 12/832,094

(22) Filed: Jul. 8, 2010

(65) Prior Publication Data

US 2011/0163603 A1    Jul. 7, 2011

Related U.S. Application Data

(60) Provisional application No. 61/281,775, filed on Nov. 23, 2009.

(51) Int. Cl.
  *H02J 3/38* (2006.01)
  *H02J 7/00* (2006.01)
(52) U.S. Cl.
  USPC .................. 307/66; 307/43; 307/64; 307/65
(58) Field of Classification Search
  USPC ....................................................... 307/64–66
  See application file for complete search history.

(56) References Cited

U.S. PATENT DOCUMENTS

| | | | |
|---|---|---|---|
| 5,206,537 A | 4/1993 | Alejandro et al. | |
| 5,929,538 A * | 7/1999 | O'Sullivan et al. | 307/66 |
| 6,184,593 B1 * | 2/2001 | Jungreis | 307/64 |
| 6,670,721 B2 * | 12/2003 | Lof et al. | 290/44 |
| 6,700,214 B2 | 3/2004 | Ulinski et al. | |
| 7,259,474 B2 | 8/2007 | Blanc | |
| 7,783,390 B2 * | 8/2010 | Miller | 700/291 |
| 7,821,147 B2 * | 10/2010 | Du Bois | 290/44 |
| 8,008,804 B2 * | 8/2011 | Capp et al. | 307/44 |
| 8,106,765 B1 * | 1/2012 | Ackerson et al. | 340/538 |

(Continued)

FOREIGN PATENT DOCUMENTS

| | | |
|---|---|---|
| WO | WO2004070907 | 8/2004 |
| WO | WO2007001154 | 1/2007 |
| WO | WO2008153735 | 12/2008 |

OTHER PUBLICATIONS

"Fully Integrated, Hall Effect-Based Linear Current Sensor IC with High Voltage Isolation and a Low-Resistance Current Conductor", Allegro MicroSystems, Inc., published on or before May 1, 2008.

(Continued)

*Primary Examiner* — Adi Amrany
(74) *Attorney, Agent, or Firm* — Dinsmore & Shohl, LLP

(57) ABSTRACT

The embodiments shown and described herein relate to a portable clean power generation and aggregation system. The system comprises a plurality of power generation units operable to generate DC electrical power, a power storage device, an inverter unit, and a main controller. The plurality of power generation units may include a solar power generation unit, a wind power generation unit, a hydro power generation unit, and a fuel-based power generation unit. The main controller is electrically coupled to the plurality of power generation units, the inverter controller, and the power storage device, and monitors DC electrical power generation by the plurality of power generation units, monitors DC electrical power received by the inverter, measures charge of the power storage device, and directs DC electrical power from the power storage device to the inverter. The nature of the system and its applications allows the effective use of wireless communications systems and the like where they would otherwise not be possible.

23 Claims, 2 Drawing Sheets

(56) References Cited

U.S. PATENT DOCUMENTS

| | | | |
|---|---|---|---|
| 8,232,676 B2* | 7/2012 | Gurunathan et al. | 307/66 |
| 8,263,276 B1* | 9/2012 | Gurunathan et al. | 429/429 |
| 2004/0125618 A1* | 7/2004 | De Rooij et al. | 363/17 |
| 2005/0077881 A1* | 4/2005 | Capp et al. | 322/29 |
| 2005/0200133 A1* | 9/2005 | Wobben | 290/55 |
| 2006/0022524 A1* | 2/2006 | Bryde et al. | 307/64 |
| 2006/0260672 A1* | 11/2006 | Niederer | 136/251 |
| 2007/0164612 A1 | 7/2007 | Wendt et al. | |
| 2008/0039979 A1 | 2/2008 | Bridges et al. | |
| 2008/0079368 A1 | 4/2008 | Kennedy et al. | |
| 2008/0203820 A1* | 8/2008 | Kramer et al. | 307/64 |
| 2008/0278003 A1* | 11/2008 | Pouchet et al. | 307/66 |
| 2009/0160259 A1* | 6/2009 | Naiknaware et al. | 307/82 |
| 2010/0076613 A1 | 3/2010 | Imes | |
| 2010/0314936 A1* | 12/2010 | Benedict et al. | 307/18 |
| 2011/0026282 A1* | 2/2011 | Chapman et al. | 363/65 |

OTHER PUBLICATIONS http://www.microhydropower.com, accessed on or before Jul. 8, 2010, "Energy Systems & Design Ltd."

http://windenergy.com, accessed on or before Jul. 8, 2010, "Whisper Brochure".

http://talcoelectronics-com, accessed on or before Jul. 8, 2010, "Power of Wind".

http://www.tamuracorp.com, accessed on or before Jul. 8, 2010, Tamura.

http://www.energysavers.gov accessed on Apr. 29, 2010, "Batteries for Stand-Alone Systems".

http://www.energysavers.gov accessed on Apr. 29, 2010 "Charge Controllers for Stand-Alone Systems".

http://www.talcoelectronics.com accessed on Apr. 16, 2010 "Whisper 200 Wind Turbine—Wind Power".

http://www.polarpowerinc.com accessed on Apr. 19, 2010 "Generator, 4 kW to 14 kW Propane/Water Cooled".

http://electronicdesign.com accessed on Apr. 15, 2010 "Maximum power-point-tracking solar battery charger".

http://www.testequity.com accessed on Jun. 10, 2010 "Tektronic A621, A622 Current Probes".

"Hit Protovoltaic Modules", Sanyo Energy (USA) Corp., Aug. 10, 2006.

* cited by examiner

SMART-GRID COMBINATION POWER SYSTEM

CROSS REFERENCE TO RELATED APPLICATIONS

This patent application claims the benefit of U.S. Provisional Application No. 61/281,775, filed Nov. 23, 2009.

TECHNICAL FIELD

The present disclosure generally relates to portable power generation systems that utilize, at least in part, sustainable power sources.

BACKGROUND

As background, large-scale single-source generation of power from sustainable (or "clean") energy sources, whether by sun, wind, or hydro, has become increasingly common. However, such power generation is impossible in many areas of the world because of weather and/or terrain limitations. Effective solar power generation requires adequate sunlight; effective wind power generation requires adequate sustained wind speeds; and effective hydro power generation requires adequate flow rates. Additionally, production of power by such single-source systems typically requires large amounts of space. Solar farms and wind farms spread for miles upon miles; hydroelectric dams traverse entire rivers. Such large-scale infrastructure displaces people and wildlife and is exceptionally vulnerable to sabotage and terrorism. The construction of such facilities may also generate significant amounts of pollution and other adverse effects. Furthermore, because of their size and cost of construction, such power generation systems, once constructed, are effectively immobile. They may provide the power needs of an area for decades, but cannot be moved to quickly provide power for other areas. Size also limits the feasibility of generating power in heavily developed areas. This is especially apparent for current power generation methods as they relate to the needs of any shipping port. With shipping vessels idling to power needed onboard utilities while docked, power generation becomes increasingly unclean.

Often, however, areas need power generation capabilities quickly or for limited periods of time. For example, in many combat zones, a permanent power generation and distribution system is neither in place nor needed. Similarly, in areas of natural disaster, the permanent power generation and distribution system may have been in place, but disabled by the disaster. Additionally, many festivals, whether musical or otherwise, are held on farms and rural areas that do not have the permanent electrical infrastructure necessary to support the power needs of the festivals. Likewise, inefficient fuel oil or diesel engines powering idle ships at port causes untold damage to the environment of the surrounding wetlands and shoreline. The addition of a smart hybrid energy generation system will help offset the waste caused by conventional methods.

At present, the temporary power generation systems currently utilized in combat zones, disaster areas, and festivals essentially amount to assemblies of gas-fueled generators. Such generators generate significant amounts of noise and air pollution. Especially in combat zones and disaster areas, such pollution heightens the level of stress associated with already-stressful situations. With increasing pressure on coastal wetlands, pollution caused by ports will eventually contribute to the loss of valuable resources in such ecosystems. Thus, there is a need for easily-installed, portable, clean power generation systems that can be employed in areas that need timely or temporary power generation, such as combat zones, disaster areas, ports, and festival locations.

SUMMARY

In one embodiment, a portable clean power generation and aggregation comprises: a plurality of power generation units operable to generate DC electrical power, further comprising a solar power generation unit, comprising a solar power generator, a solar power generator controller, and a current and voltage sensor; a wind power generation unit, comprising a wind power generator, a wind power generator controller, and a current and voltage sensor; a hydro power generation unit, comprising a hydro power generator, a hydro power generator controller, and a current and voltage sensor; a fuel-based gas power generation unit, comprising a fuel-based power generator, a fuel-based power generator controller, and a current and voltage sensor. The system further comprises a power storage device electrically coupled to the plurality of power generation units and capable of storing DC electrical power generated by the plurality of power generation units; an inverter unit, comprising an inverter and an inverter controller, wherein the inverter unit is electrically coupled to the power generation units and the power storage device and wherein the inverter converts DC electrical power into AC electrical power; and a main controller, wherein the main controller is electrically coupled to the plurality of power generation units, the inverter controller, and the power storage device, whereby the main controller can monitor DC electrical power generation by the power generation units, can monitor DC electrical power received by the inverter, can measure charge of the power storage device and direct DC electrical power from the power storage device to the inverter, and can send electronic signals to selectively activate one or more of the power generation units, and whereby DC electrical power generated by the plurality of power generation units is aggregated between the plurality of power generation units and the inverter unit.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference characters and in which:

DETAILED DESCRIPTION

The embodiments described herein generally relate to portable power generation systems that utilize, at least in part, sustainable power sources such as a solar power generation unit, a wind power generation unit, a hydro power generation unit, and a fuel-based power generation unit. Due to its portability, the system may be conveniently and quickly transported to areas which may suddenly need power (e.g., disaster areas and battle zones) or be rapidly deployed and utilized for long periods of time for maritime applications.

For purposes of this disclosure, "generator" or "power generator" means a device which produces electrical voltage and current capable operate a plurality of appliances, lights, heaters, and so forth. For example, in the generator may produce a voltage of 115 Volts AC (VAC) or 230 VAC at 60 Hz (most common in North America) to operate typical household devices. Alternatively, the generator may produce a voltage of 230 VAC at 50 Hz (most common in Europe and Asia). The electrical current produced by the generator may be any suitable amount such as, for example, 50 Amps or 100 Amps. The generator may be suitably sized or duplicated to produce the required amount of current for any particular application.

For purposes of this disclosure, a "fuel-based" power generator is a generator which produces electrical voltage and current and derives its power from combusting a fuel such as natural gas, gasoline, diesel fuel, propane, hydrogen, and so forth. The fuel may be liquid or gaseous. The fuel-based power generator may comprise, for example, an internal combustion engine coupled to an electrical generator. The internal combustion engine may operate on any suitable fuel. Other types of engines may be used as well, as is known in the art.

Figure 1:
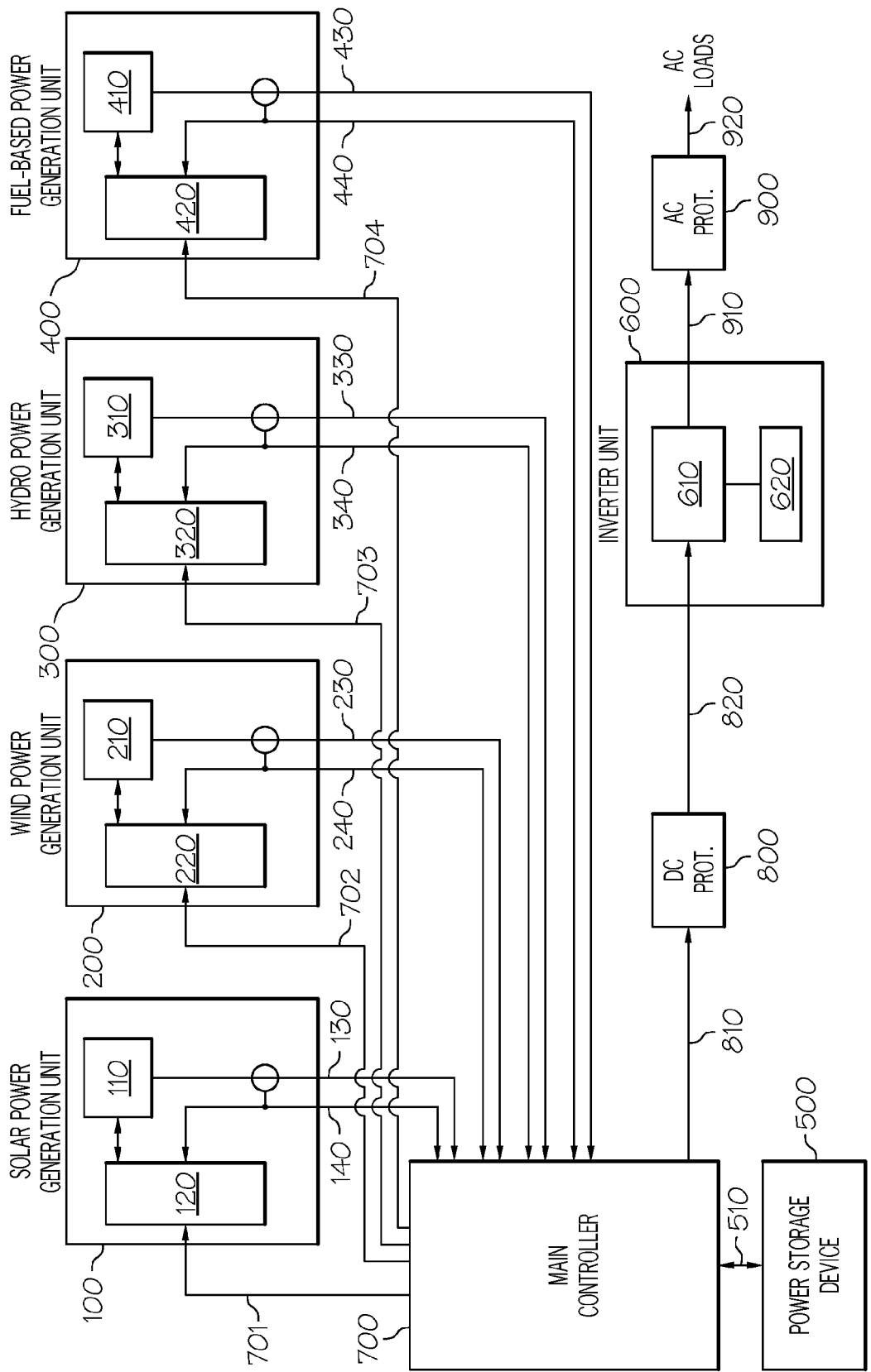
FIG. 1 depicts a portable clean power generation and aggregation system according to one or more embodiments shown and described herein.

FIG. 1 depicts a portable clean power generation and aggregation system according to one embodiment of the present disclosure. The system may include a plurality of power generation units 100, 200, 300, 400 operable to generate DC electrical power 130, 230, 330, 340. Such units may include a solar power generation unit 100, a wind power generation unit 200, a hydro power generation unit 300, and a fuel-based power generation unit 400. The system may also include a power storage device 500, an inverter unit 600, a main controller 700, DC protection 800, and AC protection 900. The system may include other components as well, as is known in the art. The elements of the system are described in detail below.

The solar power generation unit 100 comprises a solar power generator 110, a solar power generator controller 120, and a current and voltage sensor 140. The solar power generation unit 100 produces DC electrical power 130 which is transmitted to the main controller 700. Solar power generators are known in the industry and generally comprise photovoltaic cells arranged in an array. The solar power generator controller 120 is capable of actively controlling operation of the solar power generator 110, but may also passively control the solar power generator 110. The current and voltage sensor 140 detects electrical current and voltage produced by the solar power generator 110 at any particular instant in time. The solar power generator controller 120 and current and voltage sensors 140 may be incorporated into the solar power generator 110 or may be stand-alone items electrically connected to the generator by any commonly-accepted means of electrical connection (e.g., DC Bus wire).

The wind power generation unit 200 comprises a wind power generator 210, a wind power generator controller 220, and a current and voltage sensor 240. The wind power generation unit 200 produces DC electrical power 230 which is transmitted to the main controller 700. Wind power generators are known in the industry and generally comprise wind turbines that are perched atop towers. The wind power generator controller 220 is capable of actively controlling operation of the wind power generator 210, but may also passively control the wind power generator 210. The current and voltage sensor 240 detects the electrical current and voltage produced by the wind power generator 210 at any particular instant in time. The wind power generator controller 220 and current and voltage sensors 240 may be incorporated into the wind power generator 210 or may be stand-alone items electrically connected to the generator by any commonly-accepted means of electrical connection (e.g., DC Bus wire).

A hydro power generation unit 300 comprises a hydro power generator 310, a hydro power generator controller 320, and a current and voltage sensor 340. The hydro power generation unit 300 produces DC electrical power 330 which is transmitted to the main controller 700. Hydro power generators are known in the industry and generally comprise hydro turbines placed in locations with adequate flow rate. The hydro power generator controller 320 is capable of actively controlling operation of the hydro power generator 310, but may also passively control the hydro power generator 310. The current and voltage sensor 340 detects electrical current and voltage produced by the hydro power generator 310 at any particular instant in time. The hydro power generator controller 320 and current and voltage sensors 340 may be incorporated into the hydro power generator 310 or may be stand-alone items electrically connected to the generator by any commonly-accepted means of electrical connection (e.g., DC Bus wire).

Hydro power may be generated from the natural flow of a source, like the current of a river or stream or the tide of an ocean, or the power may be generated in locations where water is mechanically moved. For example, a hydro power generator may be placed immediately downstream of an outlet from which water that has been used in industrial processes (e.g., cooling systems) is discharged from an industrial plant. Similarly, hydro power may be generated through placement of the hydro generator in sewage treatment facilities.

The sustainable power generators (110, 210, and 310) can produce power when the environmental conditions allow production of power by such generators. If there is sufficient sun on a given day, the solar power generator 110 can produce power; on cloudy days, the solar power generator 110 may not be able to produce power. In large part, the solar power generator 110 and the wind power generator 210 are complementary. Sunny days are usually calm, meaning that the solar power generator 110 can produce power while the wind power generator 210 cannot; cloudy days are usually windy, so the wind power generator 210 can produce power when the solar power generator 110 cannot. On sunny and windy days, however, they will both be capable of producing power.

Depending on the emplacement of the entire portable clean power generation and aggregation system, generation of power by the hydro power generator 310 may be either intermittent or continuous. If the hydro power generator 310 is placed in a stream or river location with a continuous, consistent, and adequate flow rate, production of power by the hydro power generator 310 may be similarly continuous and consistent. If the hydro power generator 310 is placed in a location where industrial processes resulted in intermittent discharges of water and, therefore, inconsistent flow rates, generation of power by the hydro power generator 310 may be similarly intermittent.

To back up the sustainable power sources (sun, wind, and hydro), sources whose availability may at times be intermittent or insufficient for power generation, the clean power generation system includes a fuel-based power generation unit 400, comprising a fuel-based power generator 410, a fuel-based power generator controller 420, and a current and voltage sensor 440. The fuel-based power generation unit 400 produces DC electrical power 430 which is transmitted to the main controller 700. The fuel used by the fuel-based power generator 410 may serve as an on-demand resource from which power may be generated when power generation from solar, hydro, or wind resources is unavailable or insufficient.

As discussed herein, the fuel may comprise any suitable fuel such as, for example, natural gas or gasoline.

A power storage device 500 allows the storage of power generated by the power generation units. The power storage device obtains and maintains a charge through power directed to it by the various generator controllers of the power generation units. Power stored in the power storage device 500 may be used in place of that normally produced by the power generation units or it may be used in conjunction with power produced by the power generation units. For example, if a given day is cloudy, calm, and the flow rate is such that hydro power generation is not available, power stored within the power storage device 500 may be utilized to meet power needs. The power storage device 500 may comprise a battery or other suitable device to store power. If a battery is used, it may include a lead-acid battery, a Lithium-ion battery, or any other suitable battery technology, including those in the present art and those yet to be discovered.

While power may be drawn from the power storage device 500 during any time the device carries a charge, the power storage device 500 should normally be kept at or near 100% capacity, such that it may truly provide back-up power in the event all of the power generation units are or become inoperable. Maintaining a full charge on the power storage device 500 also helps prolong life of the power storage device 500.

Different power generation combinations may be utilized to accomplish goals such as maximizing efficiency, maximizing reliability, minimizing cost, or minimizing environmental impact of power generation. For example, on a cloudy, calm day, when the solar and wind power generation units are incapable of producing power, fuel-based power generator 410 is likely available and hydro power generator 310 may still be available. It may be preferable to supplement power produced by the hydro power generator 310 with power stored in the power storage device 500, rather than supplement hydro power with fuel-based-derived power, which is more expensive and less environmentally-friendly.

Each of the power generation units (100, 200, 300, and 400) is electrically connected through the main controller 700 to an inverter unit 600, which comprises an inverter 610 and an inverter controller 620. The inverter 610 receives power generated by the power generators and directed by the main controller 700 from the power storage device 500 in direct current form (i.e., DC) and converts such power to alternating current form (i.e., AC). The inverter 610 converts the DC voltage from the power generation units to AC voltage to be consumed by the user. The DC voltage may be, for example, 48 Volts DC (VDC). The AC voltage may be 115 VAC at 60 Hz. Thus, in one embodiment, the inverter 610 converts 48 VDC to 115 VAC at 60 Hz to power lights, appliances, and so forth. Other DC and AC voltages may be used as well. The inverter 610 may comprise one or more switching devices (e.g., transistors), an AC voltage sensor, and an AC current sensor. The inverter controller 620 may comprise a processor, microcontroller, or other suitable device. The inverter controller 620 may receive signals indicating the status of the AC voltage and/or current and may control the switching devices so that the desired AC voltage is consistently produced by the inverter 610, independent of the AC load.

In order to control each of the four power generation units, the main controller 700 transmits a signal 701, 702, 703, 704 to each of the units, respectively. For example, the main controller 700 transmits signal 701 to the solar power generator controller 120, signal 702 to the wind power generator controller 220, signal 703 to the hydro power generator controller 320, and signal 704 to the fuel-based power generator controller 420. Each signal 701, 702, 703, 704 may be a wired signal or a wireless signal, as is known in the art. As an example, the signals 701, 702, 703, 704 employ a wired Ethernet connection. In this manner, the main controller 700 may control the individual operation of each of the power generation units.

The main controller 700 controls the overall operation of the clean power generation system. The main controller 700 is electrically connected to each of the generator controllers (120, 220, 320, and 420), each of the current and voltage sensors (140, 240, 340, and 440), the inverter controller 620, and the power storage device 500. Through its multitude of electrical connections, the main controller 700 can monitor the electrical current and voltage produced by each of the power generation units, monitor power received by the inverter, measure the charge of the power storage device, direct power stored in the power storage device to the inverter unit, and control the operation of each of the generators by transmitting signals 701, 702, 703, 704 to selectively actuate the generators.

The main controller 700 can simply monitor power (current and voltage) generated by the individual power generation units or it can actively control the operations of such units. The main controller 700 may turn such power generation units on or off (through their individual controllers) and the main controller may coordinate the operation of the power generation units with other factors, such as prevailing environmental conditions, efficiency concerns, etc. It will be up to the operator of the system to determine how to best operate the system. For example, if most concerned about generating power rapidly, then heavy utilization of the fuel-based power generation unit 400 may be necessary; if most concerned about limiting air and noise pollution, then minimal use of the fuel-based power generation unit 400 is preferred.

Though, at its simplest, the system does not require DC protection 800 (e.g., a DC current surge protector and/or a DC current breaker) or AC protection 900 (e.g., an AC current breaker), those skilled in the art will recognize that such protectors and breakers typically improve the performance and safety of electrical systems, protect equipment, and are, in many instances, required by code. A representative placement of a DC protection 800 and AC protection 900 is shown in the system of FIG. 1.

Figure 2:
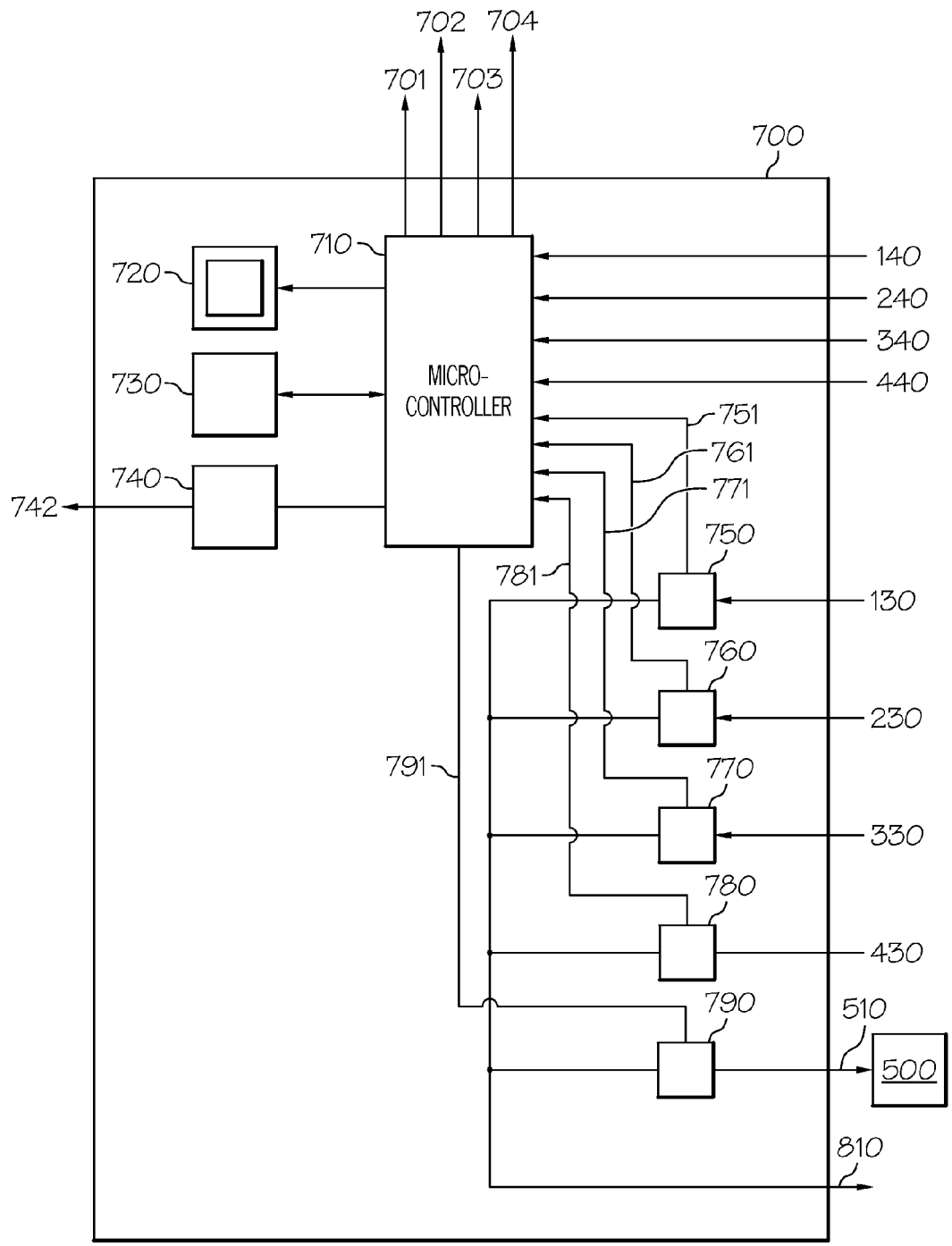
FIG. 2 depicts a main controller according to one or more embodiments shown and described herein.

FIG. 2 depicts one embodiment of a main controller 700 which may be used to control the portable clean power generation and aggregation system of FIG. 1. The main controller 700 may comprise a microcontroller 710, a display 720, an interface 730 to the controller of the fuel-based power generation unit, and a serial port 740. The microcontroller 710 may be an 8-bit processor, a 16-bit processor, or any other suitable device capable of performing the tasks and methods described herein. The microcontroller 710 may comprise a memory, which may be used to store a computer program or other data. The microcontroller 710 may also include other devices such as timers, interrupt controllers, serial interface modules, etc. in order to facilitate its operation in main controller 700. The microcontroller 710 may execute a computer program (which may be stored in the memory) which embody instructions capable of carrying out the tasks and methods described herein.

The display 720 may be any suitable display which is capable of being viewed by a user of the system. The display 720 may comprise, for example, a liquid crystal display (LCD) which is capable of displaying text, graphics, or both. The display 720 may indicate to the user the status of the system such as which generators are operating or how much electricity is being consumed by the loads. The display 720 may indicate whether any faults or errors have been detected in the system. The interface 730 may allow the microcontroller 710 to directly communicate with the fuel-based power generator controller. This may allow the main controller 700 to start and/or stop the fuel-based power generator under suitable conditions. The serial port 740 may allow a personal computer, smart phone, or other similar device to communicate with the main controller 700. As such, the serial port 740 may allow a user with a personal computer to set operating conditions of the system, monitor the status of the system, and so forth.

The microcontroller 710 may also be capable of receiving the status of the voltage and current from each power generation unit. That is, the current and voltage sensor (140, 240, 340, and 440) may be received by the microcontroller 710 from each of the power generation units (e.g., 100, 200, 300, and 400 in FIG. 1) so that the microcontroller 710 can monitor the status of each of these units. As such, the microcontroller 710 can determine which power generation units are operating and which are not. The main controller 700 may also comprise current monitors (750, 760, 770, and 780) from the electrical power (130, 230, 330, and 430) generated by each of the power generation units. This information may further allow the main controller 700 to appropriate the power generation units in a suitable manner. A signal (751, 761, 771, and 781) may be transmitted to the microcontroller 710 so that the microcontroller 710 can determine the state of each of these monitors.

The power storage device 500 may be connected to the main controller 700 via a power storage connector 510. Similarly, the inverter may be connected to the main controller 700 via an inverter connection 810. The main controller 700 may include a current monitor 790 for the power storage device 500 which monitors the current delivered to or taken from the power storage device 500. A signal 791 may be transmitted to the microcontroller 710 so that the microcontroller 710 can determine the current going to or from the power storage device 500.

The embodiments of the present disclosure, through utilization of prevailing environmental conditions, exhibit improved reliability and efficiency over single-source power generation systems, even large-scale single-source systems. Because of their reduced scale and focus on sustainable resources, these embodiments are significantly less intrusive and expensive than conventional designs. The present disclosure avoids the visual disruption associated with the large wind farms of the Great Plains and the large hydroelectric dams of the southwestern United States. Because the present invention relies primarily upon power sources that are readily available and free, it is very inexpensive to operate.

Because embodiments of the system rely primarily on renewable power sources, it promotes power independence and national security by reducing reliance upon non-renewable power resources, which typically come from regions of political and economic instability. The embodiments of the present disclosure are also environmentally-friendly. It produces very little pollution. Though fuel-based combustion does produce some greenhouse gases, if natural gas is used as the fuel, it is capable of producing much less then gas, diesel, or propane combustion. Additionally, natural gas combustion produces virtually no sulfur dioxide or particulate matter. Solar, wind, and hydro power generation produces little to no pollution.

Furthermore, because of the reduced scale of the present disclosure, it offers a flexibility and portability that is unavailable with conventional clean energy generation systems. The embodiments of the present disclosure may also be scaled to meet the power needs of such facilities as homes, commercial buildings, and manufacturing plants.

The systems shown and described herein are also portable and may be quickly and efficiently transported to areas which have a sudden need for electrical power. In one embodiment, individual trucks transport each of the power generation units. These systems may range in size from a trailer capable of being hauled by a ½ ton pick-up truck to a shipping container hauled by a large tractor truck.

In an exemplary embodiment of the portable clean power generation and aggregation system, the system may further comprise a DC current surge protector electrically coupled to the plurality of power generation units, the power storage device, and the inverter. The DC current surge protection may protect the inverter from intermittent voltage spikes which may be produced by the power generation units from time to time (e.g., when a power generation unit is switched on or switched off). In another exemplary embodiment of the portable clean power generation and aggregation system, the system may further comprise a DC current breaker electrically coupled to the power generation units, the power storage device, and the inverter. The DC current breaker may "open" and disconnect the inverter from the main controller if the DC current exceeds a certain level. Similarly, in another exemplary embodiment of the portable clean power generation and aggregation system, the system may further comprise an AC current breaker electrically coupled to the inverter. The AC current breaker may "open" and disconnect the inverter from the load if the AC current (e.g., in the load) exceeds a certain level.

In yet another exemplary embodiment of the portable clean power generation and aggregation system, the system may further comprise a local display electrically coupled to the main controller. The display, as discussed herein, may allow the system to present information to the user. In another exemplary embodiment of the portable clean power generation and aggregation system, the system may further comprise a remote management mechanism coupled to the main controller. The remote management mechanism may allow the user to remotely monitor and control the system. The remote management mechanism may be via wires or wirelessly coupled to the main controller.

In another exemplary embodiment of the portable clean power generation and aggregation system, the system is electrically coupled to a local network, which may allow any computer on the local network to access the system. In another exemplary embodiment of the portable clean power generation and aggregation system, the system is electrically coupled to a distribution grid which distributes electricity through utility wires to a large or small area. This distribution grid may either be a private or a public power grid. In another exemplary embodiment of the portable clean power generation and aggregation system, the inverter comprises an off-the-grid inverter. In another exemplary embodiment of the portable clean power generation and aggregation system, the inverter comprises a grid tie-in inverter.

In another exemplary embodiment of the portable clean power generation and aggregation system, the wind power generator is a wind turbine. In another exemplary embodiment of the portable clean power generation and aggregation system, the wind power generator comprises a wind turbine that is oriented vertically. In another exemplary embodiment of the portable clean power generation and aggregation system, the hydro power generator comprises a turbine. In another exemplary embodiment of the portable clean power generation and aggregation system, the hydro power generator comprises a helical turbine. In another exemplary embodiment of the portable clean power generation and aggregation system, the hydro power generator comprises a helical turbine that is vertically-oriented. In another exemplary embodiment of the portable clean power generation and aggregation system, the hydro power generator comprises a helical turbine that is horizontally-oriented.

Two examples of a portable clean power generation and aggregation system are given below which depict how the system may be implemented and used. These examples are not intended to be limiting, but to be explanatory. The following first example depicts one embodiment of a portable clean power generation and aggregation system shown and described herein. This embodiment may fit in a single 16-foot dual-axle trailer with a capacity of 6000 pounds. Such a trailer can be towed virtually anywhere by a pick-up truck having a suitable towing capacity (e.g., Chevrolet Silverado 1500 ½-ton, Ford F-150 ½-ton, and so forth).

In this example, the solar power generator comprises an array of six 205-watt solar panels (e.g., manufactured by Sanyo, San Diego, Calif.). The cells are hybrids of single crystalline silicon surrounded by ultra-thin amorphous silicon layers and operate at 48 volts. In full sun, the array produces approximately 1200 watts of power. The wind power generator comprises a small wind turbine positioned atop a tower (e.g., Whisper 200, Flagstaff, Ariz.). The turbine operates at 48 volts. It is capable of producing approximately 1000 watts of power. The hydro power generator comprises a turbine (e.g., Low Head 1000 by Energy Systems & Design Ltd., Sussex, New Brunswick, Canada) positioned in a river. The turbine operates at 48 volts and, at maximum head, produces approximately 1000 watts of power.

The fuel-based power generator uses natural gas as a fuel and is designed to augment the sustainable power generators mentioned above. It comprises a natural gas engine with an alternator (e.g., Daihatsu 950P Gas Engine with Model 6250 Alternator, by Polar Power Inc.) The natural gas power generator produces up to approximately 9000 watts of power.

In this first example, each of the generators is connected to both its own generator controller and its own current and voltage sensor. Each of the generator controllers and current and voltage sensors is connected to a main controller. The main controller monitors current and voltage produced by each of the generators and actively or passively controls each generator through the respective generator's generator controller.

Power generated by the generators passes through the current and voltage sensors and is directed to a power storage device or an inverter unit or both, depending on power consumption and needs. If the power storage device is fully charged, power will be directed to the inverter. From there, power will be directed to a local network or distribution grid. If the power storage device is not fully charged and generation exceeds demand, some or all of the generated power may be directed to the power storage device until it is fully charged. If consumption exceeds demand, the inverter may receive power from both the one or more active generators and the power storage device. Ideally, the charge of the power storage device will be kept as near to 100% as possible at all times, so that it may provide back-up power in the event all generators fail. Accordingly, in most instances when power consumption exceeds generation by sustainable sources, the natural gas generator will be activated to meet the deficiency. With all of the power generators operating at maximum capacity, the system produces approximately 12,200 watts of power, about 3200 of which come from sustainable energy sources. The clean power generation system is backed up by a deep-cycle battery pack.

The following second example depicts another embodiment of a portable clean power generation and aggregation system shown and described. In this second example, the system is used to generate power for a 2500 square foot home having power-efficient upgrades.

The solar power generator comprises an array of six 205-watt solar panels (e.g., manufactured by Sanyo, San Diego, Calif.). The cells are hybrids of single crystalline silicon surrounded by ultra-thin amorphous silicon layers and operate at 48 volts. In full sun, the array produces approximately 1230 watts of power. The wind power generator comprises a small wind turbine positioned atop a tower (e.g., Whisper 200, Flagstaff, Ariz.). The turbine operates at 48 volts. It produces approximately 1200 watts of power when the wind speed is 26 miles per hour and 200 kilowatts per month at 12 mile per hour wind speed. The hydro power generator comprises a turbine (e.g., Stream Engine by Energy Systems & Design Ltd., Sussex, New Brunswick, Canada) positioned at a 15 meter head in a water source with a 100 gallon per minute flow rate. The turbine operates at 48 volts and produces approximately 500 watts of power.

The fuel-based power generator uses natural gas as a fuel and is designed to augment the sustainable power generators mentioned above. It comprises a natural gas engine with an alternator (e.g., Daihatsu 950P Gas Engine with Model 6250 Alternator, by Polar Power Inc.) The natural gas power generator produces up to 9000 watts of power. With all of the power generators operating on max capacity, the system produces approximately 11,730 watts of power, about 2730 of which come from sustainable energy sources.

The clean power generation system is backed up by a deep-cycle battery pack. The house uses an average of 10.96 kilowatt hours of power per day, with a peak demand of 3.7 kilowatts. The battery pack consists of 24 2-volt deep cycle batteries, for a total voltage of 48. The battery pack provides capacity of 1110 ampere hours or about 18-20 hours of back-up power to the home. It is contemplated that the battery pack will typically not drop below 80% state of charge (SOC).

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A portable clean power generation and aggregation system, the system comprising:
    a plurality of power generation units operable to generate DC electrical power, further comprising
    a solar power generation unit, comprising a solar power generator, a solar power generator controller, and a current and voltage sensor;
    a wind power generation unit, comprising a wind power generator, a wind power generator controller, and a current and voltage sensor;
    a hydro power generation unit, comprising a hydro power generator, a hydro power generator controller, and a current and voltage sensor;
    a fuel-based power generation unit, comprising a fuel-based power generator, a fuel-based power generator controller, and a current and voltage sensor, wherein the fuel-based power generation unit is electrically coupled to a common DC voltage circuit;

a power storage device electrically coupled to the plurality of power generation units and capable of storing DC electrical power generated by the plurality of power generation units;

an inverter unit, comprising an inverter and an inverter controller, wherein the inverter unit is electrically coupled to all of the plurality of power generation units and the power storage device and wherein the inverter converts DC electrical power from all of the plurality of power generation units into AC electrical;

a main controller, wherein the main controller is electrically coupled to the plurality of power generation units via each of the power generator controllers, the inverter controller, and the power storage device, wherein the DC electrical power is sent from the plurality of power generation units to the main controller to at least one of the following: the power storage device for storage and the inverter unit, whereby the main controller monitors DC electrical power generation by the plurality of power generation units via receipt of a signal from each of the voltage sensors, measures DC electrical power received by the inverter, measures charge of the power storage device and direct DC electrical power from the power storage device to the inverter, and sends electronic signals to each of the power generator controllers to selectively control operation of one or more of the plurality of power generation units based on a prevailing environmental condition, and whereby DC electrical power generated by the plurality of power generation units is aggregated between the plurality of power generation units and the inverter unit;

a control interface between the fuel-based power generation unit and the main controller to facilitate direct communication for the main controller to control activation of the fuel-based power generation unit;

a serial port that facilitates communication between the main controller and a peripheral computing device;

a DC current surge protector electrically coupled to the plurality of power generation unites, the power storage device, and the inverter, wherein the DC current surge protector protects the inverter from intermittent voltage spikes;

an AC current breaker electrically coupled to the inverter, wherein the AC current breaker disconnects the inverter if an AC current exceeds a predetermined level; and a remote management mechanism coupled to the main controller, wherein the remote management mechanism provides an interface for a user to remotely monitor and control the system, wherein the system is in the range in size from a trailer capable of being hauled by a ½ton pick-up truck to a shipping container hauled by a large tractor truck.

2. The system of claim 1, further comprising a local display electrically coupled to the main controller.

3. The system of claim 1, further comprising a remote management mechanism coupled to the main controller.

4. The system of claim 1, wherein the remote management mechanism comprises wireless telecommunications.

5. The system of claim 1, wherein the system is electrically coupled to a local network.

6. The system of claim 1, wherein the system is electrically coupled to a distribution grid.

7. The system of claim 6, wherein the distribution grid is a public power grid.

8. The system of claim 1, wherein the inverter comprises an off-the-grid inverter.

9. The system of claim 1, wherein the inverter comprises a grid tie-in inverter.

10. The system of claim 1, wherein the wind power generator is a wind turbine.

11. The system of claim 10, wherein the wind turbine is a vertically-oriented wind turbine.

12. The system of claim 1, wherein the hydro power generator comprises a turbine.

13. The system of claim 12, wherein the turbine is a helical turbine.

14. The system of claim 12, wherein the turbine is a vertically-oriented turbine.

15. The system of claim 12, wherein the turbine is a horizontally-oriented turbine.

16. The system of claim 1, wherein the hydro power generator is suspended by a buoy.

17. The system of claim 1, wherein the fuel-based power generator comprises a natural gas power generator.

18. The system of claim 1, wherein the power storage device is a battery pack.

19. The system of claim 18, wherein the battery pack comprises multiple batteries.

20. The system of claim 1, wherein the portable clean power generation and aggregation system is transported in a 16-foot or shorter trailer.

21. The system of claim 1, wherein the system is capable of being electrically coupled to a second portable clean power generation and aggregation system such that the system and the second portable clean power generation and aggregation system operate in parallel.

22. The system of claim 21, further comprising a connector which is capable of electrically coupling the system to the second portable clean power generation and aggregation system.

23. The system of claim 1, wherein the system is providing a wireless signal to transmit information to a portable wireless device.

* * * * *